United States Patent
Wiesneth

(10) Patent No.: US 8,905,211 B2
(45) Date of Patent: Dec. 9, 2014

(54) MULTIPLE CLUTCH DEVICE

(75) Inventor: Thomas Wiesneth, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 808 days.

(21) Appl. No.: 12/746,280

(22) PCT Filed: Oct. 31, 2008

(86) PCT No.: PCT/EP2008/064801
§ 371 (c)(1),
(2), (4) Date: Jun. 4, 2010

(87) PCT Pub. No.: WO2009/071399
PCT Pub. Date: Jun. 11, 2009

(65) Prior Publication Data
US 2010/0243395 A1 Sep. 30, 2010

(30) Foreign Application Priority Data
Dec. 6, 2007 (DE) .......................... 10 2007 058 852

(51) Int. Cl.
F16D 25/10 (2006.01)
F16D 21/06 (2006.01)
F16D 25/12 (2006.01)
F16D 25/0638 (2006.01)

(52) U.S. Cl.
CPC ............ *F16D 25/12* (2013.01); *F16D 25/0638* (2013.01); *F16D 21/06* (2013.01); *F16D 25/10* (2013.01); *Y02T 10/76* (2013.01)
USPC .................. 192/48.619; 192/110 B

(58) Field of Classification Search
USPC .................. 192/48.619, 48.611, 48.618, 48.8
See application file for complete search history.

(56) References Cited

U.S. PATENT DOCUMENTS

| | | | |
|---|---|---|---|
| 5,413,202 A * | 5/1995 | Maucher | 192/107 C |
| 6,360,863 B1 * | 3/2002 | Young | 192/85.51 |
| 6,543,597 B2 * | 4/2003 | Tanikawa | 192/48.611 |
| 7,255,038 B2 | 8/2007 | Onishi et al. | |
| 7,335,127 B2 * | 2/2008 | Tiesler et al. | 475/284 |
| 7,392,890 B2 * | 7/2008 | Agner | 192/110 B |
| 7,416,069 B2 * | 8/2008 | Tiesler | 192/48.611 |
| 7,648,012 B2 | 1/2010 | Gremplini et al. | |
| 7,819,589 B2 | 10/2010 | Hofmann et al. | |
| 2001/0037926 A1 * | 11/2001 | Ouchi | 192/45 |
| 2004/0248684 A1 | 12/2004 | Sugiura et al. | |
| 2007/0155573 A1 | 7/2007 | Gassmann et al. | |
| 2007/0221468 A1 * | 9/2007 | George et al. | 192/87.11 |
| 2009/0097793 A1 | 4/2009 | Hofmann et al. | |
| 2009/0114500 A1 * | 5/2009 | Kato et al. | 192/87.15 |

FOREIGN PATENT DOCUMENTS

| | | |
|---|---|---|
| CN | 1846080 | 10/2006 |
| DE | 102005014556 A1 | 10/2006 |
| DE | 10 2005 061268 Y | 6/2007 |
| EP | 1 609 654 X | 12/2005 |
| EP | 1 923 590 | 5/2008 |
| WO | 2006048179 Y | 5/2006 |
| WO | 2007076771 | 7/2007 |

* cited by examiner

Primary Examiner — Rodney H Bonck
(74) Attorney, Agent, or Firm — Simpson & Simpson, PLLC

(57) ABSTRACT

A multiple clutch device, particularly a double clutch device, that has a reduced axial installation space and/or inexpensive production. The multiple clutch device has at least two friction clutch arrangements, torque-transferring friction element carriers, each of which is rotationally fixedly connected to a frictional element of the frictional clutch arrangements, and at least one roller bearing. The roller bearing is designed to support at least one of the frictional element carriers. The supported frictional element carrier is designed as a race of the roller.

18 Claims, 5 Drawing Sheets

MULTIPLE CLUTCH DEVICE

CROSS-REFERENCE TO RELATED APPLICATIONS

This application is a 371 of PCT/EP2008/064801 filed Oct. 31, 2008, which in turn claims the priority of DE 10 2007 058 852.8 filed Dec. 6, 2007, the priority of both applications is hereby claimed and both applications are incorporated by reference herein.

FIELD OF THE INVENTION

The invention relates to a multiple clutch device, in particular a dual clutch device, having at least two friction clutch arrangements, having torque-transmitting friction element carriers which are connected fixedly in each case to a friction element of the friction clutch arrangements so as to rotate with it, and having at least one antifriction bearing, the antifriction bearing being configured for supporting at least one of the friction element carriers.

Multiple clutch devices are used in drive trains of motor vehicles, in order to make it possible to shift gears without interrupting the transmission of power. To this end, the multiple clutch devices usually have two friction clutch arrangements which are connected on the input side to a common torque-providing shaft of the engine and on the output side alternately to in each case one transmission drive shaft. During operation, when the gears are shifted, the torque flow is transmitted without interruption from the first friction clutch arrangement to the second friction clutch arrangement.

Document WO 2006/048179 A1 discloses a dual clutch device which has two multiple disk clutch arrangements which alternately transmit a torque from a drive unit to a transmission. The dual clutch device has two friction clutches with multiple disk assemblies, the two clutch arrangements being nested radially inside one another for reasons of a short axial design of the dual clutch device, with the result that a friction clutch is positioned radially on the inside and the other friction clutch is positioned radially on the outside. The multiple disk assemblies are carried by sheet metal pots which are supported partly with respect to one another and with respect to a clutch cover by way of axial bearings.

Document U.S. Pat. No. 7,255,038 B2 which arguably forms the closest prior art discloses a dual clutch device for an automatic transmission having two multiple disk clutch arrangements which are positioned next to one another in the axial direction and in each case have approximately the same diameter. On account of the positioning of the multiple disk clutch arrangements, this known dual clutch device requires a comparatively large amount of axial installation space. Here too, the multiple disk assemblies of the multiple disk clutch arrangements are carried by sheet metal pots which are supported with respect to one another and with respect to a sheet metal part (not shown in greater detail) by means of axial antifriction bearings. The sheet metal part which is not shown in greater detail is configured as an axial bearing disk for one of the axial antifriction bearings.

BRIEF SUMMARY OF THE INVENTION

The invention is based on the object of proposing a multiple clutch device, in particular a dual clutch device, which is distinguished by a reduced axial installation space and/or inexpensive production.

Preferred or advantageous embodiments of the invention are shown in the subclaims, the following description and the appended figures.

The multiple clutch device according to the invention is suitable and/or configured for a vehicle and has at least two friction clutch arrangements. In particular, as a result of an overlapping and/or alternating actuation of the friction clutch arrangements, the multiple clutch device permits a gear change of a transmission connected behind it without an interruption in the traction power. In principle, the multiple clutch arrangement can be realized as a dry device, but it is preferred that it is configured as a wet-running dual clutch, in particular one which runs in an oil sump. The friction clutch arrangements are preferably configured as multiple disk clutch arrangements. In general, the friction clutch arrangements can be arranged as desired with respect to one another, that is to say, for example, offset with respect to one another in the axial direction. If the aim is to save installation space in the axial direction, however, it is preferred if the friction clutch arrangements are arranged so as to be nested in one another and/or to overlap in the radial direction and/or concentrically with respect to one another.

The multiple clutch device has torque-transmitting friction element carriers, the friction element carriers being connected fixedly in each case to a friction element of the friction clutch arrangements so as to rotate with it. The friction elements are preferably configured as multiple disk assemblies, one radially inner multiple disk assembly being frictionally connected to one radially outer multiple disk assembly per friction clutch arrangement during the transmission of torque. The friction element carriers are preferably configured as sheet metal pots which are arranged fixedly on a shaft so as to rotate with it. Furthermore, it is preferred that the friction element carriers are arranged such that they cannot be displaced in the axial direction; in particular, the friction element carriers are not moved in the axial direction in the case of an actuation of the friction clutch arrangements.

The friction element carriers are preferably supported and/or guided and/or mounted in the axial direction with respect to one another and/or with respect to a guide face which is fixed to the housing. To this end, bearings are used which are arranged between the friction element carriers and/or between friction element carriers and the guide face which is fixed to the housing. In a narrower embodiment of the invention, the bearings are configured only for mutually supporting the friction element carriers. It is structurally advantageous if the bearings are prestressed in the axial direction only by a spring, with the result that axial forces of the friction element carriers can generally be comparatively low. At least one of the bearings is configured as an antifriction bearing which supports at least one friction element carrier. In one preferred embodiment, the friction element carrier is positioned on that side of the friction clutch arrangements which faces the engine or the drive unit.

It is proposed according to the invention that the supported friction element carrier is configured as a raceway of the antifriction bearing, with the result that the rolling bodies of the antifriction bearing roll directly and without intermediate components on the friction element carrier.

As a result of this inventive development, the friction element carrier has a double function, the torque being transmitted firstly by the friction element carrier, and the friction element carrier secondly providing a raceway for the antifriction bearing. As a result of this development, component costs are saved by the omission of at least one bearing disk or one bearing ring. A further usable advantage lies in the saving of installation space in the axial direction, since, on account of the raceway being integrated in the friction element carrier, the required installation space for the antifriction bearing can be reduced and the friction element carriers can be positioned more closely to one another.

In one preferred structural implementation, the antifriction bearing is configured as an axial antifriction bearing, the raceway being oriented in one advantageous implementation in a radial plane perpendicularly with respect to an input and/or output shaft or with respect to their rotational axis. In one possible specific embodiment, the antifriction bearing is configured as a needle bearing.

A multiple clutch device is also proposed, the antifriction bearing being configured as a ball bearing which has balls as rolling bodies, even independently of the position of the raceway.

In a first possible development, the friction element carrier is configured as a shaped sheet metal part, the raceway being configured of one material and/or in one piece on the friction element carrier. The raceway can therefore already be formed in the shaped sheet metal part during the forming operation. In a first possible embodiment, the bearing face is configured as a nonhardened region and therefore has the hardness of the basic material of, for example, less than 200 HV (DIN EN ISO 6507).

In alternative embodiments, the friction element carrier or the shaped sheet metal part is hardened either locally or completely, in particular is blank hardened, induction hardened or the like, hardnesses between 200 HV and 650 HV being preferred in the case of the raceway. In yet other embodiments, a material which has already been prehardened, for example what is known as an H & T material (hardening and tempering), is used as basic material of the shaped sheet metal part, with the result that subsequent hardening can be dispensed with and the bearing faces nevertheless have a hardness in the specified range.

In another possible development of the invention, the friction element carrier is configured as a composite material part, for example of sandwich design, the bearing face being introduced of one material and/or in one piece in a layer of the composite material. In this development, the sandwich material is formed, the raceway likewise being available directly after the forming operation. In another possible development of the invention, the friction element carrier has a plated and/or coated region as raceway, which region improves the abrasion strength and/or hardness of the bearing face.

In one possible embodiment, the raceway is configured as a raceway which is without osculation and/or is flat. In modified embodiments, contours which make it possible, for example, to receive rolling bodies with osculation are made in the raceway and/or in the friction element carrier. Receiving with osculation is understood to mean a raceway with a radius of curvature which is selected to be somewhat larger (more than 5%) than the radius of curvature of the rolling body which bears against it. In one concrete embodiment, the contour is realized as a running groove for the rolling bodies. Further installation space can be saved by virtue of the fact that the rolling bodies are arranged recessed in sections in the contour in the friction element carrier.

At least one further bearing, in particular at least one further antifriction bearing, is provided for supporting one of the friction element carriers, even independently of the position of the raceway, the antifriction bearing and the further bearing being arranged so as to overlap one another in the radial direction or in the radial projection and/or at an axial spacing from one another which is smaller than the sheet metal thickness of the friction element carriers. Here, the extent of one of the bearings in the axial direction is preferably defined as the total width including associated bearing disks and/or as the total width between the raceways of the antifriction bearing. Furthermore, it is preferred that the antifriction bearing and the further bearing are arranged such that they are offset with respect to one another in the radial direction, with the result that they are positioned in an axial projection without overlapping.

The expressions axial and radial orientation, etc. relate to the rotational axis of the input and/or output shaft of the multiple clutch arrangement.

The advantage of the development is to be seen in the fact that, as a result of the antifriction bearing and the further bearing being arranged offset in the radial direction, they can be arranged more closely relative to one another than in the known prior art.

In one preferred development of the invention, at least or precisely three bearings including the antifriction bearing are provided, said bearings being arranged in a v-shaped, stepped or s-shaped manner. In this embodiment, any desired bearing can be used instead of the antifriction bearing.

In the case of a v-shaped arrangement, a middle bearing is situated radially inside or radially outside the two remaining bearings which are preferably arranged at the same or at a similar radial height. In the case of a stepped arrangement, the three bearings are arranged in an axial projection above one another without overlapping, to be precise in a stair shape or in a semicircular shape for example. Said arrangements permit positioning of the bearings in a manner which saves a lot of installation space. In other words, at least two bearings have different pitch circle diameters, the pitch circle preferably being defined as a diameter which runs through the center of the rolling bodies and/or of the sliding faces of the bearings.

In one particularly preferred development of the invention, at least two of the bearings in each case have a pitch circle which runs outside the other bearing. In particular, the raceways or sliding tracks of at least two of the bearings lie in the axial projection without overlapping.

With the aim of saving material costs, it is proposed in addition that the antifriction bearing exhibits empty locations in the population with rolling bodies. For example, only every fifth pocket or only every fifth space of the antifriction bearing is populated with a rolling body.

A further measure according to the invention for reducing axial installation space comprises, even independently of the position of the raceway, a main shaft, that is to say the input and/or the output shaft or one of the output shafts of the multiple clutch device, in particular the main shaft which is connectable and/or is connected fixedly to a downstream transmission so as to always rotate with it, being mounted via a spherical roller bearing.

Optionally, the bearing arrangement of the main shaft may comprise further bearing elements, for example sliding bearings, other antifriction bearings, etc. In a more special embodiment, one of the output shafts is mounted on the transmission side only by precisely one spherical roller bearing.

Installation space is saved in the axial direction of the multiple clutch device by the use of a spherical roller bearing in comparison with the use of another bearing according to the prior art. The axial width of the spherical roller bearing is, for example, of narrower configuration than a corresponding deep groove ball bearing with rolling balls, since the rolling bodies of the spherical roller bearing make narrower bearing rings than the deep groove ball bearing possible, on account of the special design.

In one preferred structural embodiment of the invention, the spherical roller bearing has rolling bodies in the form of spherical rollers. As shown in FIG. 11, spherical roller 26 has in each case two side faces 28 and 29 which are flattened symmetrically from a basic spherical shape and are arranged parallel to one another. In one preferred embodiment of the invention, the spherical rollers have a width between their side faces of approximately 70% of the maximum diameter. With respect to further optional details of the spherical roller bearing, reference is made to document WO 2007/076771 A1, the disclosure content of which is fully incorporated by reference. The shape of spherical roller 26 shown in FIG. 11 is also known as a spherical barrel shape.

Since significantly radial forces have to be absorbed by the spherical roller bearing, it is preferred that the spherical roller bearing has an inner and an outer bearing ring which are arranged concentrically with respect to one another. Axial forces are absorbed by the spherical rollers being oriented automatically in the force direction in operation during the action of axial forces.

The ball bearing is preferably configured structurally in such a way that it can absorb forces with a force vector which assumes an intermediate angle with respect to a radial plane which is arranged perpendicularly with respect to the rotational axis of the spherical roller bearing of at least 5°, in particular of at least 10°, preferably at least 15° and/or at most 60°, preferably at most 45° and, in particular, at most 30°.

In a special structural refinement of the invention, the multiple clutch device has at least two output shafts, which device is configured in the form of a hollow shaft arrangement with an inner output shaft and an outer output shaft which encloses the inner output shaft concentrically at least in sections. In the preferred embodiment, the radially outer output shaft is mounted by the spherical roller bearing; as an alternative or in addition, the inner output shaft may also be mounted via the spherical roller bearing.

BRIEF DESCRIPTION OF THE SEVERAL VIEWS OF THE DRAWINGS

Further features, advantages and effects of the invention are explained in the following text using preferred exemplary embodiments of the invention. In the drawing.

DETAILED DESCRIPTION OF THE INVENTION

Identical or corresponding parts are provided in the figures in each case with the same or corresponding designations.

Figure 1:
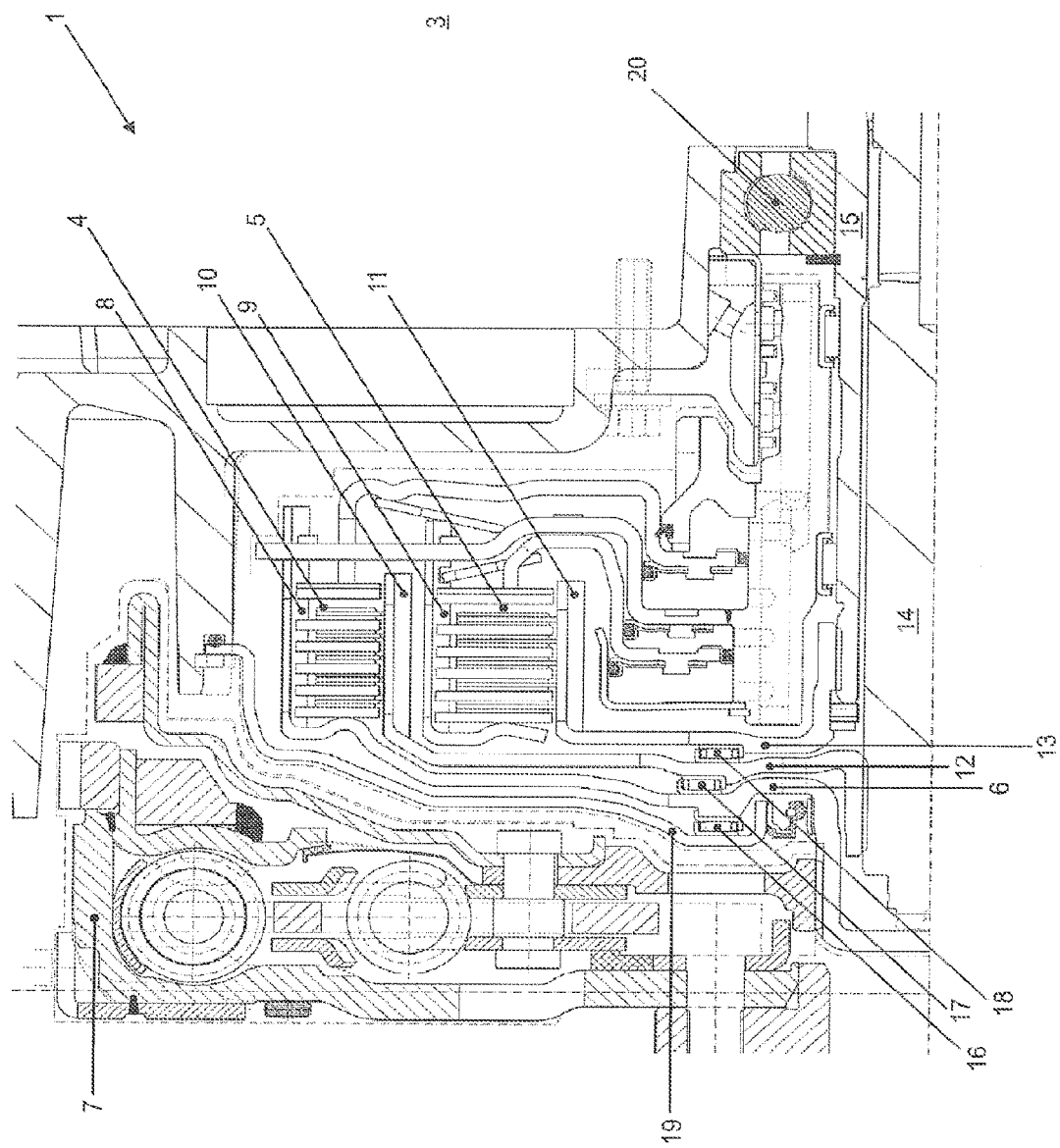
FIG. 1 shows a multiple clutch device according to the prior art in order to define various components.

FIG. 1 shows a schematic longitudinal section illustration of a dual clutch device 1 which is configured and/or arranged for transmitting a torque from an engine side 2 to a transmission side 3.

For the releasable transmission of the torque, the dual clutch device 1 has two multiple disk clutches 4 and 5 which are nested radially inside one another. In other words, the multiple disk clutches 4 and 5 are arranged concentrically or overlapping one another in a radial projection. A very compact, axial design of the dual clutch device 1 is achieved by the nested arrangement of the multiple disk clutches 4 and 5.

Starting from the engine side 2, a torque is introduced via a first multiple disk carrier 6 which is arranged such that it is rotatable about a center axis. To this end, the first multiple disk carrier 6 is meshed with or connected in a rotationally fixed manner to a flywheel 7 of the engine side 2 indirectly or via a damping element. The torque which is introduced into the first multiple disk carrier 6 is transmitted to outer multiple disk assemblies 8, 9 of the multiple disk clutches 4 or 5, with the result that the latter are driven in a rotationally fixed manner with the multiple disk carrier 6.

In order to divert the torques, inner multiple disk assemblies 10 and 11 of the multiple disk clutches 4 or 5 are connected in a rotationally fixed manner to a second multiple disk carrier 12 and a third multiple disk carrier 13, respectively. The second multiple disk carrier 12 is placed on an inner shaft 14 in a rotationally fixed manner via radial splining, and the third multiple disk carrier 13 engages with a rotationally fixed connection into an outer shaft 15 which is configured as a hollow shaft and in the interior of which the inner shaft 14 is positioned.

During operation, the torque which is introduced via the first multiple disk carrier 6 is optionally transmitted via the first or the second multiple disk clutch 4 or 5 to the second multiple disk carrier 12 or the third multiple disk carrier 13 and therefore to the inner shaft 14 or the outer shaft 15.

The multiple disk carriers 6, 12 and 13 are usually prestressed in the axial direction via a spring device (not shown) or the like and require axial bearings 16, 17 and 18 or a selection thereof for axial support. The axial bearing 16 is arranged between the first multiple disk carrier 6 and a cover 19 which is fixed to the housing. The second axial bearing 17 supports the second multiple disk carrier 12 with respect to the first multiple disk carrier 6. The third axial bearing 18 is arranged between the second multiple disk carrier 12 and the third multiple disk carrier 13 for axial support. As results from the dual clutch device 1 (shown in FIG. 1) according to the prior art, a relatively wide axial installation space is required for the axial bearings 16, 17 and 18, as a result of which the overall axial length of the dual clutch device 1 is increased.

The outer shaft 15 is supported both axially and radially on the transmission side 3 by means of a ball bearing 20 in the form of a deep groove ball bearing. Overall, a wide axial installation space is used by the bearing arrangements shown, which installation space is therefore no longer available for the remaining construction of the dual clutch device 1 and, in particular, for the oil feed lines.

Figure 2:
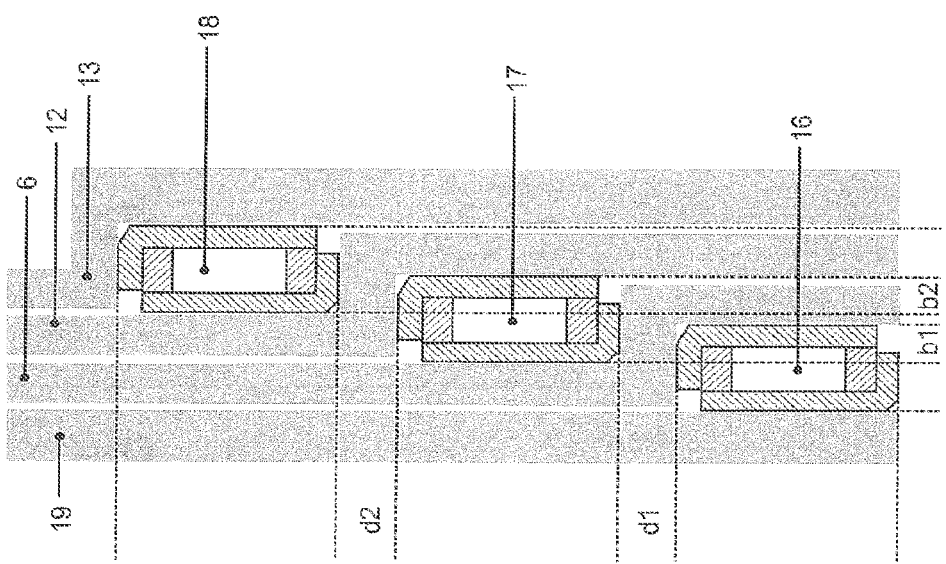
FIG. 2 shows a first possible arrangement of axial bearings in a multiple clutch arrangement in accordance with FIG. 1.

As a first exemplary embodiment for a compact design, FIG. 2 shows a modified arrangement of the three axial bearings 16, 17 and 18 in FIG. 1. The three axial bearings 16, 17 and 18 are arranged vertically offset from one another in the radial direction, with the result that they are arranged without overlapping in an axial projection and/or at a spacing d1 or d2 from one another. In a radial projection, the axial bearings 16 and 17 overlap with a width b1 and the axial bearings 17 and 18 overlap with a width b2.

Although the axial bearings 16, 17 and 18 in FIG. 2 are arranged so as to extend obliquely in the direction of the multiple disk clutches 4, 5, they can also be positioned mirror-symmetrically with respect to the latter in modified embodiments, that is to say in an obliquely extending arrangement with an orientation to the engine side 2. As shown in FIG. 2, the overlapping regions b1 or b2 are configured as positive overlaps, and negative overlaps result in modified embodiments, that is to say clearances in the radial projection, the corresponding clearances b1, b2 being in each case of smaller configuration, however, than the sheet metal thickness of the multiple disk carriers 6, 12 and/or 13.

Figure 3:
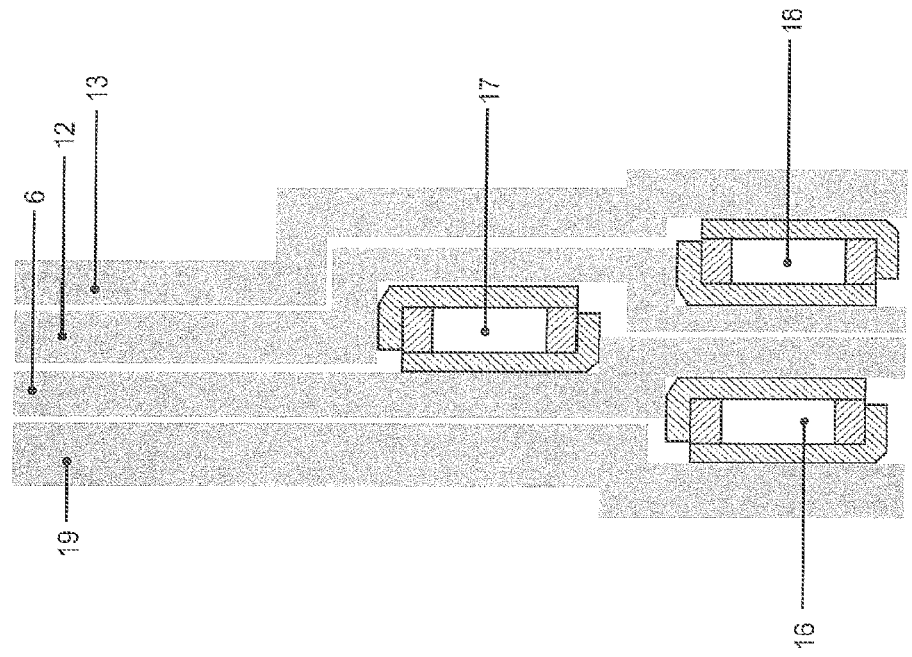
FIG. 3 shows a second possible arrangement of axial bearings in a multiple clutch arrangement in accordance with FIG. 1.

FIG. 3 shows a further possible arrangement of the axial bearings 16, 17 and 18 as a second exemplary embodiment of the arrangement, the axial bearings 16, 17 and 18 being arranged in an inverted manner in a v-shape or a triangular shape. It is also the case here that the arrangement can be of mirrored configuration, that is to say vertically v-shaped. The small overall size in the axial direction is achieved by the fact that the central axial bearing 17 is arranged so as to overlap with the axial bearings 16 or 18 in a radial projection and/or at a small axial spacing which is of smaller configuration than the sheet metal thickness of the multiple disk carriers 6, 12 and/or 13.

Figure 4:
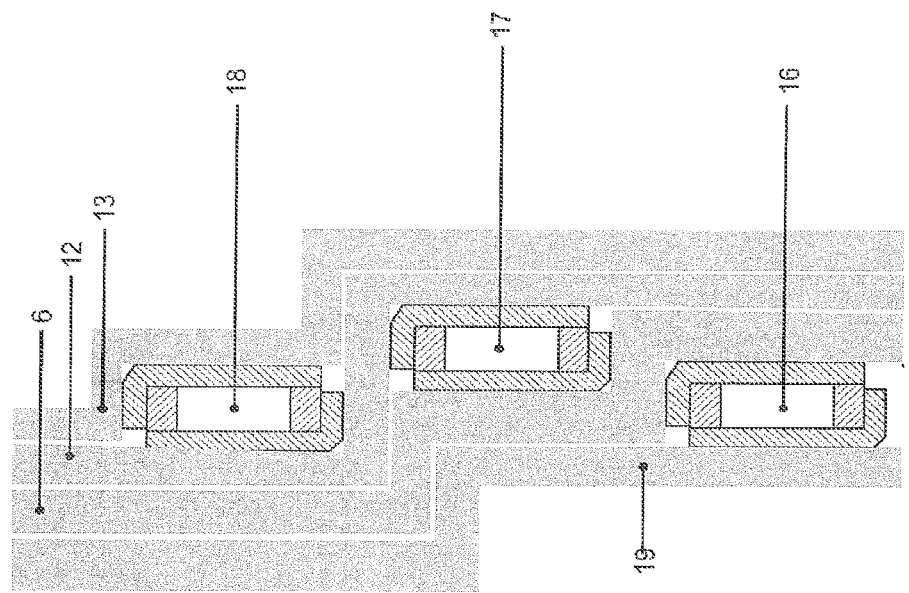
FIG. 4 shows a third possible arrangement of axial bearings in a multiple clutch arrangement in accordance with FIG. 1.

FIG. 4 shows a third possible arrangement of the axial bearings 16, 17 and 18 as a third exemplary embodiment, the axial bearings being arranged above one another in an arcuate and/or sinuous manner. Here too, a small axial overall size of the dual clutch device 1 is achieved by the overlapping of the axial bearings 16, 17, 18 in a radial projection.

Figure 5:
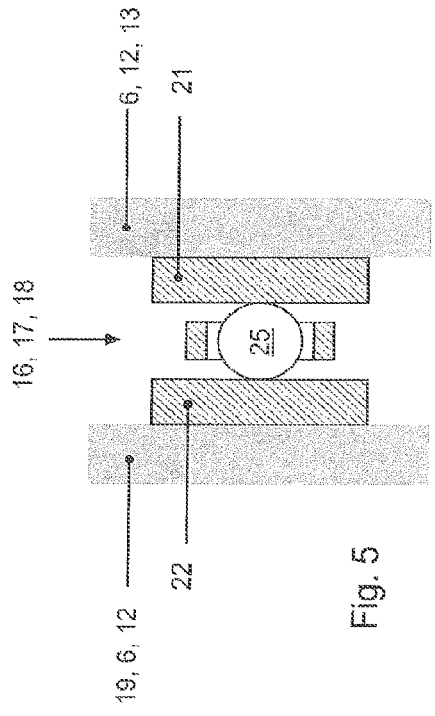
FIG. 5 shows a first possible embodiment of a ball bearing as axial bearing.

FIG. 5 shows a very schematic illustration of a first alternative for one of the axial bearings 16, 17 and/or 18 in preceding FIGS. 1 to 4 as a development, the axial bearings 16, 17, 18 or a selection thereof being configured as ball bearings which run on two axial disks 21 and 22 which are arranged on or at the multiple disk carriers 6, 12 and/or 13. Axial installation space can likewise be saved by the use of ball bearings instead of needle bearings, with suitable dimensioning. The use of ball bearings also permits a higher packing density in the radial direction, in particular in the arrangements in accordance with FIGS. 2 to 4.

Figure 6:
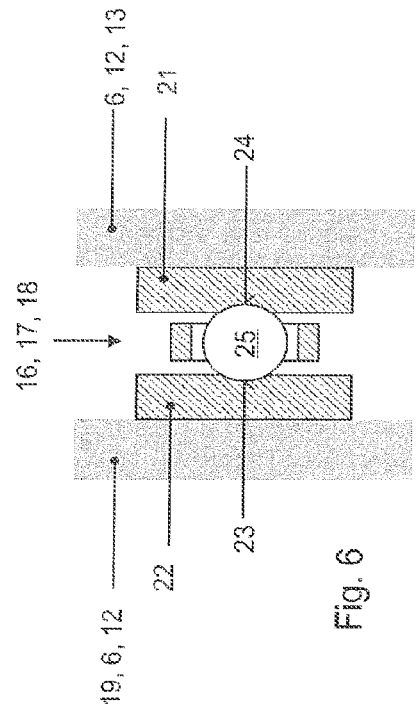
FIG. 6 shows a second possible embodiment of a ball bearing as axial bearing.

FIG. 6 shows the axial bearing 16, 17, 18 in FIG. 5 in a second alternative embodiment, the axial disks 21 or 22 in each case having a groove 23 or 24, respectively, in which the rolling bodies 25 of the axial bearing 16, 17 or 18 run. As a result of the introduction of the groove 23 and 24, the width of the axial disks is reduced in the region which determines the axial installation space, with the result that the axially required installation space is reduced further by this design. It is also possible to introduce the groove 23 or 24 in only one axial disk 21 or 22 and to leave the other groove 24 or 23 with a flat raceway.

Instead of the use of an axial disk 21 or 22 for a ball bearing as shown in FIGS. 5 and 6 or for a needle bearing as shown in FIGS. 2 to 4, the multiple disk carrier 6, 12 and 13 can serve as raceway for the respective rolling body. In this case, the raceway is an integral and/or single material constituent part of the multiple disk carrier 6, 12 and 13. The advantages which result from this are a reduction in the required individual parts, in the assembly outlay and therefore in the manufacturing outlay, and also the possibility of producing the raceways in the forming process during the production of the multiple disk carriers 6, 12 or 13. Firstly, said raceways may be configured as nonhardened raceways, since the axial loading in the dual clutch device 1 is relatively low. In alternative embodiments, the multiple disk carriers 6, 12 or 13 are formed from a hardened material, after the forming operation, and/or are hardened by an additional layer either everywhere or only in the regions of the raceway. For example, what is known as an H & T material (hardening and tempering material) is used as hardened, formable material. For example, a sandwich material which comprises a harder material layer may be formed as a composite material. In the case of subsequent hardening, it may be carried out, for example, via blank hardening or induction hardening. The increase in the hardness of the raceways by means of an additional layer preferably takes place via subsequent coating or plating of the running region in the case of the multiple disk carriers 6, 12 or 13.

Figure 7:
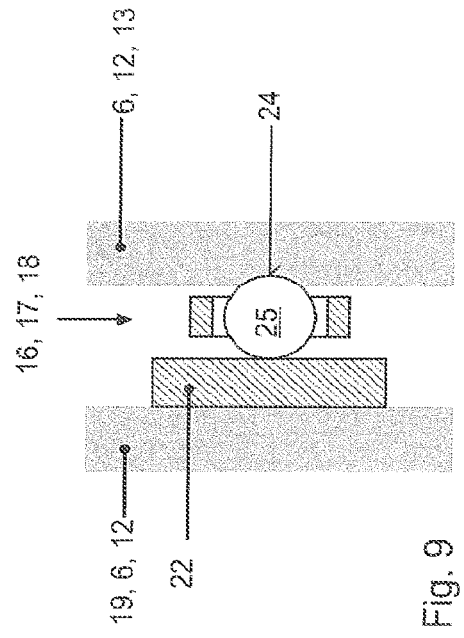
FIG. 7 shows a third possible embodiment of a ball bearing as axial bearing.

A third embodiment of the axial bearing 16, 17 or 18 is shown in FIG. 7, balls 25 of the axial bearing 16, 17 or 18 rolling directly on one of the multiple disk carriers 6, 12 or 13 or cover 19 on the engine or transmission side. As a result, for example, the axial disk 21 shown in FIG. 5 is dispensed with and the axial installation space is reduced.

Figure 8:
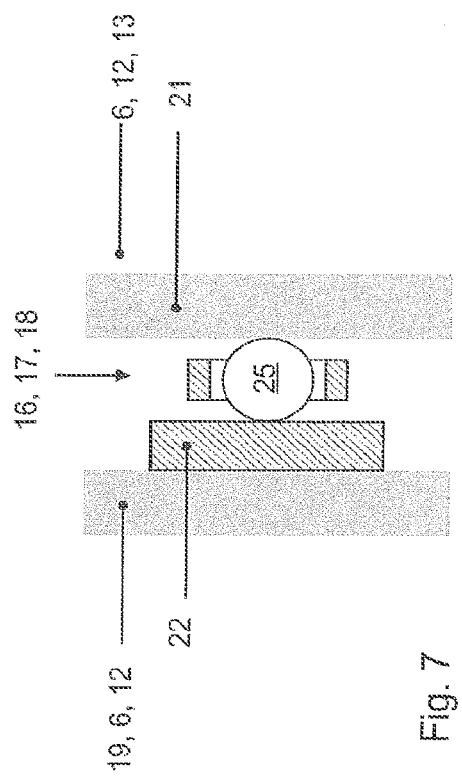
FIG. 8 shows a fourth possible embodiment of a ball bearing as axial bearing.

As can be gathered from FIG. 8 as a fourth embodiment, both axial disks 21 and 22 can also be dispensed with, the balls 25 rolling on both sides directly on the multiple disk carriers 6, 12, 13 or cover 19.

Figure 9:
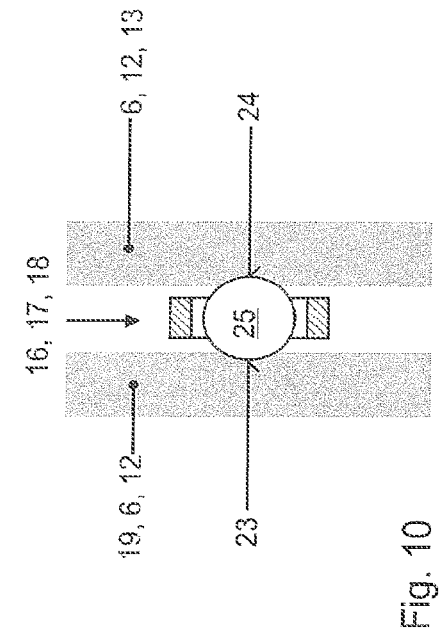
FIG. 9 shows a fifth possible embodiment of a ball bearing as axial bearing.

FIG. 9 shows a fifth embodiment which is configured analogously to the embodiment in FIG. 7 but, in contrast to the latter, has a groove 24 which is formed in the multiple disk carrier 6, 12, 13 and in which the balls 25 roll, in order to reduce the axial space requirement.

Figure 10:
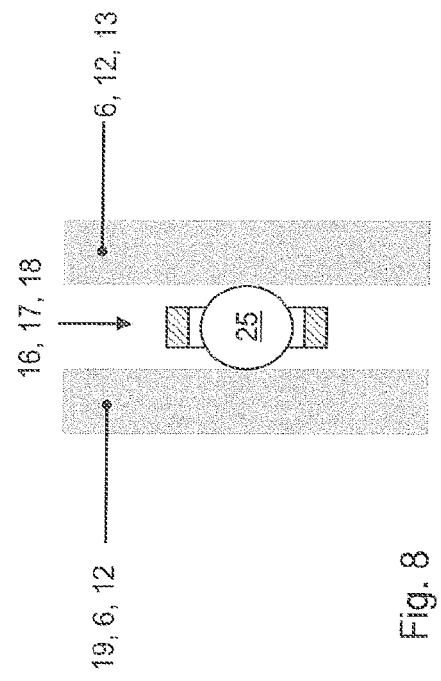
FIG. 10 shows a sixth possible embodiment of a ball bearing as axial bearing.
Figure 11:
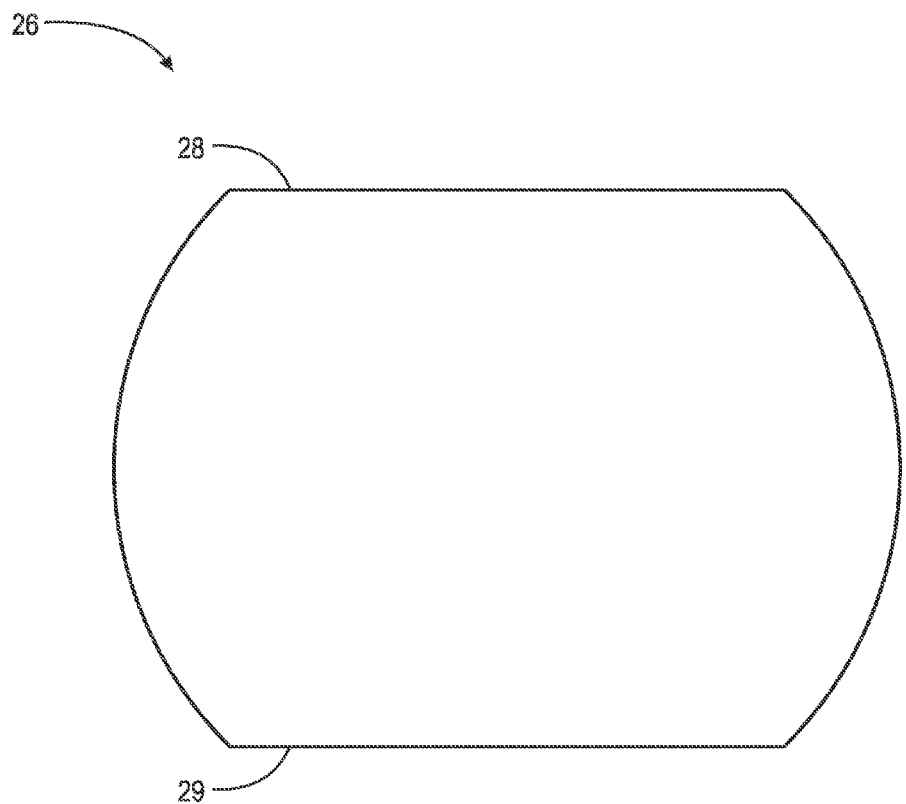
FIG. 11 shows the shape of an example spherical roller.

As results from FIG. 10, a sixth embodiment, a groove 23 may also be formed on the raceway which lies opposite the groove 24, either as shown in FIG. 10 in the other multiple disk carrier 6, 12 or cover or in an axial disk (not shown) 22.

In general, other rolling bodies, in particular needles, may also be used instead of the balls 25 in FIGS. 5 to 10. The geometry of the axial disks 21, 22 and the geometry of the grooves 23, 24 then have to be adapted correspondingly.

As a further possibility for reducing the components, the number of rolling bodies in the rolling body bearings in accordance with FIGS. 2 to 10 may be reduced; for example, only every n-th pocket, for example every 5th pocket of the rolling body bearing, may be filled with a rolling body.

A further measure to obtain further installation space in the axial direction is the replacement of the deep groove ball bearing 20 in FIG. 1 by a spherical roller bearing (not shown), as is proposed, for example, in document WO 2007/076771 A1 or in DE 10 2005 0145 56.6. The disclosure with regard to the spherical roller bearings in the cited documents is included in the present disclosure by way of reference.

A further alternative embodiment comprises sliding disks being used instead of axial needle bearings, as in FIGS. 2 to 4, or ball bearings, as in FIGS. 5 to 10, the sliding disks being formed either as separate components or partially or completely by the multiple disk carriers 6, 12 or 13.

LIST OF DESIGNATIONS

1 Dual clutch device
2 Engine side
3 Transmission side
4, 5 Multiple disk clutches
6 Multiple disk carrier 7 Flywheel
8, 9, 10, 11 Multiple disk assemblies
12 Second multiple disk carrier
13 Third multiple disk carrier
14 Inner shaft
15 Outer shaft
16, 17, 18 Axial bearing
19 Cover
20 (Deep groove) ball bearing
21, 22 Axial disks
23, 24 Groove
25 Rolling body, ball
26 Spherical roller
28, 29 Side faces

The invention claimed is:

1. A multiple clutch device, comprising:
at least two friction clutch arrangements, each having at least two friction elements;
torque-transmitting friction element carriers which are connected fixedly in each case to one of the friction elements of the friction clutch arrangements so as to rotate with it; and
at least one antifriction bearing, the antifriction bearing supporting at least one of the friction element carriers, wherein the at least one of the friction element carriers is a raceway of the antifriction bearing; and
at least one further bearing for supporting at least another of the friction element carriers, the antifriction bearing and the at least one further bearing being arranged so that radial projections of the antifriction bearing and the at least one further bearing overlap one another in a radial direction.

2. The multiple clutch device recited in claim 1, wherein the antifriction bearing is an axial antifriction bearing.

3. The multiple clutch device recited in claim 1, wherein the raceway is arranged on a radial plane with respect to an input shaft and/or an output shaft of the multiple clutch device.

4. The multiple clutch arrangement recited in claim 1, wherein the antifriction bearing is a ball bearing.

5. The multiple clutch device recited in claim 1, wherein the friction element carriers are shaped sheet metal parts.

6. The multiple clutch device recited in claim 1, wherein the raceway is configured as one piece with the friction element carriers.

7. The multiple clutch device recited in claim 1, wherein the raceway is arranged in a hardened region of the friction element carriers.

8. The multiple clutch device recited in claim 1, wherein the friction element carriers are composite material parts.

9. The multiple clutch device recited in claim 1, wherein the friction element carriers each have a plated and/or coated region as raceway.

10. The multiple clutch device recited in claim 1, wherein the raceway is configured without osculation and/or is flat.

11. The multiple clutch device recited in claim 1, wherein the raceway has a depression.

12. The multiple clutch device recited in claim 1, wherein the antifriction bearing or the at least one further bearing exhibits empty locations in a population with rolling bodies.

13. The multiple clutch device recited in claim 1, further comprising: an input shaft, by way of which a torque is introduced into the multiple clutch device, having at least two output shafts, by way of which the torque is diverted out of the multiple clutch device, and having a bearing arrangement for mounting the input shaft and/or at least one of the output shafts, the bearing arrangement comprising at least one spherical roller bearing.

14. The multiple clutch device recited in claim 13, wherein the spherical roller bearing has rolling bodies, each of the rolling bodies having a spherical barrel shape.

15. The multiple clutch device recited in claim 13, wherein the spherical roller bearing has an inner bearing ring and an outer bearing ring which are arranged concentrically with respect to one another.

16. The multiple clutch device recited in claim 13, wherein the spherical roller bearing is configured for absorbing forces with a force vector which an intermediate angle with respect to a radial plane which is arranged perpendicularly with respect to a rotational axis of at least 5° and at most 60°.

17. The multiple clutch device recited in claim 13, wherein two of the output shafts are arranged in a common hollow shaft arrangement, the radially outer of the output shafts being mounted by the spherical roller bearing.

18. The multiple clutch recited in claim 11, wherein the raceway has a depression as a running groove.

* * * * *